(12) United States Patent
Adkins et al.

(10) Patent No.: US 11,932,754 B2
(45) Date of Patent: Mar. 19, 2024

(54) HIGH SPECIFIC GRAVITY GEOSYNTHETIC COMPRISING POLYPROPYLENE

(71) Applicant: Propex Operating Company, LLC, Chattanooga, TN (US)

(72) Inventors: Chastity Adkins, Chattanooga, TN (US); Drew Loizeaux, Chattanooga, TN (US); Scott Manning, Chattanooga, TN (US); Lee Pierce, Chattanooga, TN (US)

(73) Assignee: Propex Operating Company, LLC, Chattanooga, TN (US)

( * ) Notice: Subject to any disclaimer, the term of this patent is extended or adjusted under 35 U.S.C. 154(b) by 26 days.

(21) Appl. No.: 17/653,766

(22) Filed: Mar. 7, 2022

(65) Prior Publication Data

US 2022/0289957 A1 Sep. 15, 2022

Related U.S. Application Data

(60) Provisional application No. 63/159,831, filed on Mar. 11, 2021.

(51) Int. Cl.
*C08L 23/14* (2006.01)
*C08F 10/06* (2006.01)
*E02D 17/20* (2006.01)

(52) U.S. Cl.
CPC .............. *C08L 23/14* (2013.01); *C08F 10/06* (2013.01); *E02D 17/20* (2013.01); *C08L 2201/02* (2013.01); *E02D 2300/0085* (2013.01)

(58) Field of Classification Search
CPC ... E02D 2300/0085; C08F 10/06; C08K 5/17; C08L 23/14
See application file for complete search history.

(56) References Cited

U.S. PATENT DOCUMENTS 7,462,254 B2 12/2008 Halahmi et al.
2003/0166372 A1 9/2003 Thomas
(Continued)

FOREIGN PATENT DOCUMENTS

CN 110747582 A 2/2020
KR 20160134894 A * 11/2016

OTHER PUBLICATIONS

International Search Report and Written Opinion for International Application No. PCT/US22/19175 dated Jun. 2, 2022, 24 pages.

*Primary Examiner* — Mark S Kaucher
(74) *Attorney, Agent, or Firm* — Barnes & Thornburg, LLP; Tina M. Dorr

(57) ABSTRACT

The present disclosure provides a geosynthetic. In one embodiment, the geosynthetic contains a composition containing (A) a polypropylene and (B) from greater than 0 wt % to less than 3 wt % of a halogen-free flame retardant, based on the total weight of the composition. In another embodiment, the geosynthetic contains a composition containing (A) a polypropylene and (B) greater than 20 wt % zinc sulfide, based on the total weight of the composition. In another embodiment, the geosynthetic contains a composition containing (A) a polypropylene; (B) a halogen-free flame retardant; and (C) greater than 20 wt % zinc sulfide, based on the total weight of the composition. The composition has a specific gravity greater than 1.00 g/cc.

25 Claims, 2 Drawing Sheets

(56) References Cited

U.S. PATENT DOCUMENTS

| | | | |
|---|---|---|---|
| 2008/0210359 A1* | 9/2008 | Halahmi | B29C 66/731 |
| | | | 156/218 |
| 2009/0286060 A1 | 11/2009 | Sala et al. | |
| 2019/0023886 A1* | 1/2019 | Crouch | D01F 1/10 |
| 2019/0145056 A1 | 5/2019 | Cooley | |

* cited by examiner

HIGH SPECIFIC GRAVITY GEOSYNTHETIC COMPRISING POLYPROPYLENE

This application claims priority of U.S. Provisional Application No. 63/159,831 filed Mar. 11, 2021. This application is directed to a geosynthetic suitable for stabilizing terrain (e.g., soil, rocks, sand, vegetation, etc.). Specifically, this application relates to a geosynthetic containing a composition containing polypropylene, the composition having a specific gravity value that enables the geosynthetic to sink in water.

TECHNICAL FIELD

Background

Terrain erosion is a significant, world-wide environmental challenge for which there are relatively few good solutions. After thousands of years, the problem of erosion still exists because most known methods and devices to prevent terrain erosion cannot withstand the natural elements over time, are too costly to implement, are too cumbersome to use, and are basically ineffective.

In the past, attempts to prevent terrain erosion have failed to be suitable for arid dry climates, areas that have a greater fire potential index (including grass fires, forest fires, vandalism, and electrical transmission areas), and areas where regulatory bodies require additional fire retardants due to their flammability.

Attempts to prevent terrain erosion have also failed in hydraulic applications, where materials are under water for any period of time (such as in streams, banks, ponds, canals, channels, levees, and shorelines) because the materials float in water. These materials require anchorage to the terrain to keep in place, and the floating material has limited contact with the terrain.

Thus, a need exists for an effective solution to the problem of terrain erosion, which the present application addresses.

SUMMARY

The present disclosure provides a geosynthetic. The geosynthetic contains a composition containing (A) a polypropylene and (B) from greater than 0 wt % to less than 3 wt % of a halogen-free flame retardant, based on the total weight of the composition. The composition has a specific gravity greater than 1.00 g/cc.

The present disclosure also provides a geosynthetic containing a composition containing (A) a polypropylene and (B) greater than 20 wt % zinc sulfide, based on the total weight of the composition. The composition has a specific gravity greater than 1.00 g/cc.

The present disclosure also provides a geosynthetic containing a composition containing (A) a polypropylene; (B) a halogen-free flame retardant; and (C) greater than 20 wt % zinc sulfide, based on the total weight of the composition. The composition has a specific gravity greater than 1.00 g/cc.

DEFINITIONS AND TEST METHODS

Figure 1:
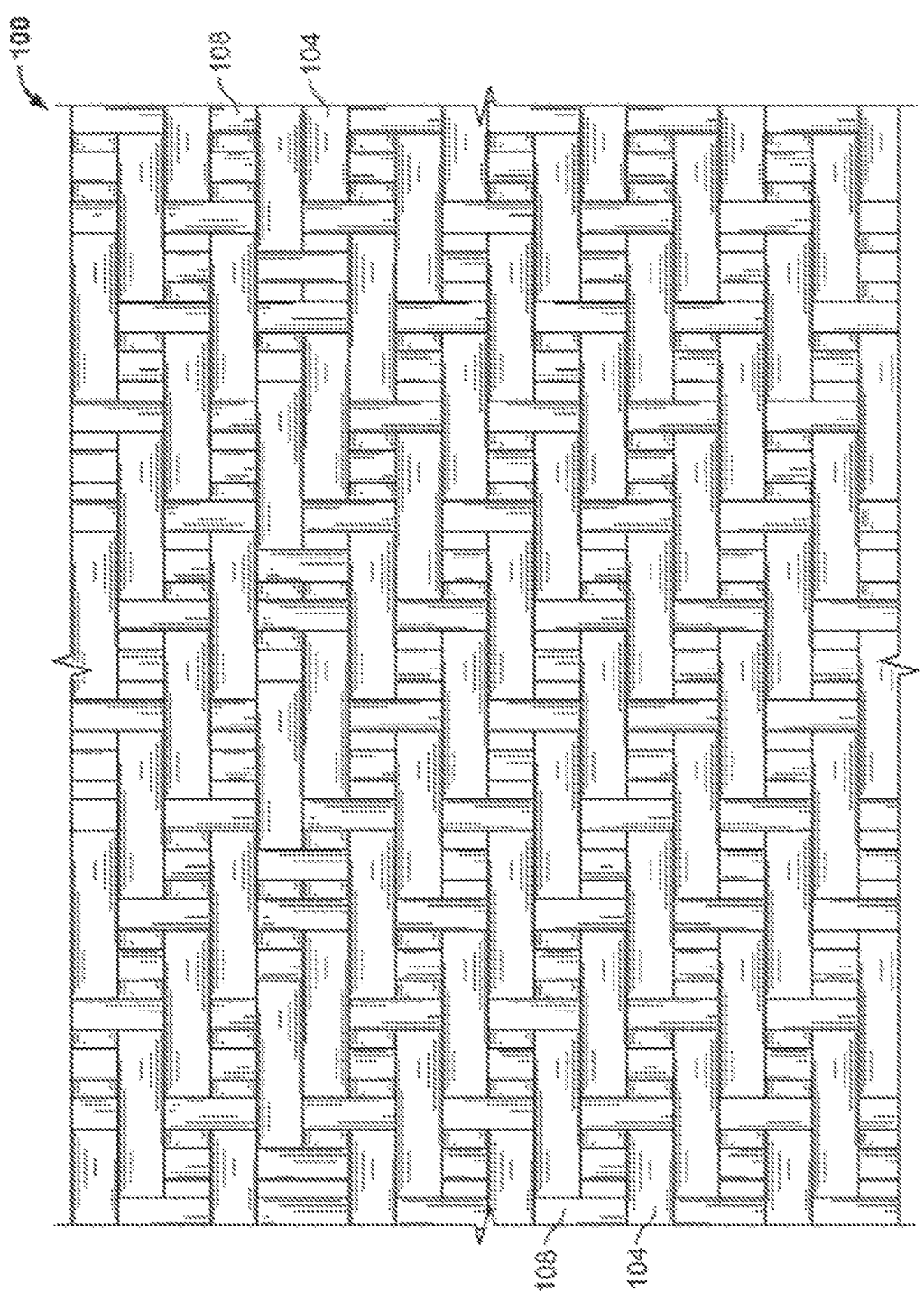
FIG. 1 is a top view of a woven geotextile in accordance with an embodiment of the present disclosure.

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

"Blend," "polymer blend" and like terms refer to a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method used to measure and/or identify domain configurations.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Fabric" is a woven structure or a non-woven (such as knitted) structure formed from individual fibers or yarn.

"Fiber" and like terms refer to an elongated column of entangled filaments. Fiber diameter can be measured and reported in a variety of fashions. Generally, fiber diameter is measured in denier per filament. Denier is a textile term which is defined as the grams of the fiber per 9,000 meters of that fiber's length. Monofilament generally refers to an extruded strand having a denier per filament greater than 15, usually greater than 30. Fine denier fiber generally refers to fiber having a denier of 15 or less. Microdenier (aka microfiber) generally refers to fiber having a diameter not greater than 100 micrometers.

"Filament" and like terms refer to a single, continuous strand of elongated material having generally round cross-section and a length to diameter ratio of greater than 10.

A "flame retardant" is a compound that inhibits or delays the spread of fire by suppressing combustion reactions.

A "halogen" is an element in IUPAC Group 17 of the Periodic Table of Elements, which includes fluorine (F), chlorine (Cl), bromine (Br), iodine (I), and astatine (At).

"Halogen-free" refers to a flame retardant or a composition that substantially excludes halogen, or excludes halogen. A flame retardant or composition that substantially excludes halogen contains from 0 mg/kg, or greater than 0 mg/kg to less than 2,000 mg/kg halogen, based on the total weight of flame retardant or composition, as measured by ion chromatography (IC), or a similar analytical method. In an embodiment, the halogen-free flame retardant or composition contains 0 mg/kg halogen, based on the total weight of flame retardant or composition.

A "knitted fabric" is formed from intertwining yarn or fibers in a series of connected loops either by hand, with knitting needles, or on a machine. The fabric may be formed by warp or weft knitting, flat knitting, and circular knitting. Nonlimiting examples of suitable warp knits include tricot, raschel powernet, and lacing. Nonlimiting examples of suitable weft knits include circular, flat, and seamless (which is often considered a subset of circular knits).

"Nonwoven" refers to a web or a fabric having a structure of individual fibers or threads which are randomly interlaid, but not in an identifiable manner as is the case of a knitted fabric.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to as being based on "units" that are the polymerized form of a corresponding monomer.

Specific gravity is measured in accordance with ASTM D792. The result is recorded in grams (g) per cubic centimeter (g/cc or g/cm$^3$).

A "textile" is a flexible material composed of a network of natural fibers, synthetic fibers, and combinations thereof. Textile includes fabric and cloth.

"Woven" refers to a web or a fabric having a structure of individual fibers or threads which are interlaid in a pattern in an identifiable manner. A nonlimiting example of a woven fabric is a knitted fabric.

"Yarn" is a continuous length of twisted or otherwise entangled filaments that can be used in the manufacture of woven or knitted fabrics.

DETAILED DESCRIPTION

The present disclosure provides a geosynthetic containing a composition containing a polypropylene and from greater than 0 wt % to less than 3 wt % of a halogen-free flame retardant, based on the total weight of the composition. The composition has a specific gravity greater than 1.00 g/cc.

The present disclosure also provides a geosynthetic containing a composition containing a polypropylene and greater than 20 wt % zinc sulfide, based on the total weight of the composition. The composition has a specific gravity greater than 1.00 g/cc.

The present disclosure also provides a geosynthetic containing a composition containing (A) a polypropylene; (B) a halogen-free flame retardant; and (C) greater than 20 wt % zinc sulfide, based on the total weight of the composition. The composition has a specific gravity greater than 1.00 g/cc.

A. Polypropylene

The composition contains a polypropylene.

The polypropylene is a propylene homopolymer. In other words, the polypropylene contains, consists essentially of, or consists of, units derived from propylene.

Polypropylene has a specific gravity of from 0.90 g/cc to 0.92 g/cc, or of 0.92 g/cc.

In an embodiment, the polypropylene is present in the composition in an amount of from 35 wt % to less than 100 wt %, or from 40 wt % to less than 100 wt %, or from 50 wt % to less than 100 wt %, or from 60 wt % to less than 100 wt %, or from 70 wt % to less than 100 wt %, or from 90 wt % to less than 100 wt %, or from greater than 97 wt % to less than 100 wt %, or from 97.01 wt % to 99.99 wt %, or from 97.5 wt % to 99.9 wt %, or from 98 wt % to 99.9 wt %, or from 98.5 wt % to 99.9 wt %, based on the total weight of the composition. In another embodiment, the polypropylene is present in the composition in an amount of from 20 wt %, or 30 wt %, or 35 wt %, or 40 wt %, or 50 wt %, or 55 wt %, or 60 wt %, or 65 wt %, or 70 wt %, or 73 wt % to 75 wt %, or 80 wt %, or 85 wt %, or 90 wt %, or 95 wt %, or 98 wt %, or 99.9 wt %, or less than 100 wt %, based on the total weight of the composition.

B. Halogen-Free Flame Retardant

In an embodiment, the composition contains a polypropylene and from greater than 0 wt % to less than 3 wt % of a halogen-free flame retardant, based on the total weight of the composition. The composition has a specific gravity greater than 1.00 g/cc.

In an embodiment, the composition contains a polypropylene, a halogen-free flame retardant, and greater than 20 wt % zinc sulfide, based on the total weight of the composition. The composition has a specific gravity greater than 1.00 g/cc.

The halogen-free flame retardant substantially excludes halogen, or excludes halogen. In other words, the halogen-free flame retardant is bromine-free.

Nonlimiting examples of halogen-free flame retardants include metal hydrates, silica, glass powder, metal carbonate, zinc sulfide, antimony trioxide, amines, and combinations thereof. A nonlimiting example of a suitable amine flame retardant is propanediamine.

It is understood that when the composition contains a combination of halogen-free flame retardant and zinc sulfide, the halogen-free flame retardant is different than zinc sulfide. In an embodiment, the halogen-free flame retardant is selected from metal hydrates, silica, glass powder, metal carbonate, antimony trioxide, amines, and combinations thereof.

In an embodiment, the halogen-free flame retardant is an amine flame retardant. In a further embodiment, the halogen-free flame retardant is propanediamine.

In an embodiment, the halogen-free flame retardant is zinc sulfide.

The halogen-free flame retardant is present in the composition in an amount of from greater than 0 wt % to less than 3 wt %, based on the total weight of the composition. In an embodiment, the halogen-free flame retardant is present in the composition in an amount of from greater than 0 wt %, or 0.01 wt %, or 0.05 wt %, or 0.10 wt %, or 0.50 wt %, or 1.00 wt % to 1.50 wt %, or 2.00 wt %, or 2.50 wt %, or 2.75 wt %, or 2.90 wt %, or 2.95 wt %, or 2.99 wt %, or less than 3 wt %, based on the total weight of the composition. In another embodiment, the halogen-free flame retardant is present in the composition in an amount of from 0.01 wt % to 2.99 wt %, or from 0.01 wt % to 2.50 wt %, or from 0.01 wt % to 2.00 wt %, or from 0.01 wt % to 1.50 wt %, based on the total weight of the composition.

In an embodiment, the composition contains (A) a polypropylene; (B) a halogen-free flame retardant; and (C) greater than 20 wt % zinc sulfide, based on the total weight of the composition. The composition has a specific gravity greater than 1.00 g/cc. In a further embodiment, the composition contains greater than 0 wt %, or greater than 1 wt %, or from greater than 0 wt % to 20 wt %, or from greater than 0 wt % to 15 wt %, or from greater than 0 wt % to 10 wt %, or from greater than 0 wt % to 5 wt %, or from greater than 0 wt % to 3 wt %, or from 1 wt % to 3 wt %, or from 1 wt % to 5 wt %, or from 1 wt % to 10 wt %, or from 3 wt % to 10 wt %, or from 3 wt % to 5 wt %, or from 1 wt % to 20 wt %, or from 3 wt % to 20 wt % halogen-free flame retardant, based on the total weight of the composition.

The halogen-free flame retardant may comprise two or more embodiments disclosed herein.

C. Zinc Sulfide

In an embodiment, the composition contains polypropylene and greater than 20 wt % zinc sulfide, based on the total weight of the composition. The composition has a specific gravity greater than 1.00 g/cc.

In an embodiment, the composition contains (A) a polypropylene; (B) a halogen-free flame retardant; and (C) greater than 20 wt % zinc sulfide, based on the total weight of the composition. The composition has a specific gravity greater than 1.00 g/cc.

It is understood that when the composition contains a combination of halogen-free flame retardant and zinc sulfide, the halogen-free flame retardant is different than zinc sulfide.

Zinc sulfide (ZnS) is a compound having a specific gravity of 4.0 g/cc.

In an embodiment, the zinc sulfide is present in the composition in an amount greater than 20 wt %, based on the total weight of the composition. In another embodiment, the zinc sulfide is present in the composition in an amount of from greater than 20 wt % to less than 100 wt %, or from 21 wt % to 75 wt %, or from 21 wt % to 50 wt %, or from 21 wt % to 30 wt %, or from 21 wt % to 27 wt %, or from 25 wt % to 50 wt %, or from 25 wt % to 30 wt %, or from 27 wt % to 30 wt %, based on the total weight of the composition. In another embodiment, the zinc sulfide is present in the composition in an amount from 21 wt %, or 25 wt %, or 27 wt % to 30 wt %, or 35 wt %, or 40 wt %, or 50 wt %, or 75 wt %, or 80 wt %, based on the total weight of the composition.

D. Optional Additive

In an embodiment, the composition contains (A) polypropylene, (B) halogen-free flame retardant, and (C) one or more optional additive. The composition has a specific gravity greater than 1.00 g/cc.

In another embodiment, the composition contains (A) polypropylene, (B) zinc sulfide, and (C) one or more optional additive. The composition has a specific gravity greater than 1.00 g/cc.

In another embodiment, the composition contains (A) polypropylene, (B) halogen-free flame retardant, (C) zinc sulfide, and (D) one or more optional additive. The composition has a specific gravity greater than 1.00 g/cc.

Nonlimiting examples of suitable additive include wood, glass, metal, ultra violet (UV) absorbers or stabilizers, carbon black, plasticizers, oils, stabilizers, antioxidants, pigments, dyestuffs, antiblock additives, polymeric additives, defoamers, preservatives, thickeners, rheology modifiers, humectants, fillers, solvents, nucleating agents, surfactants, chelating agents, gelling agents, processing aids, cross-linking agents, neutralizing agents, flame retardants (that are different than the halogen-free flame retardant), fluorescing agents, compatibilizers, antimicrobial agents, and combinations thereof.

In an embodiment, the composition includes an ultra violet (UV) absorber or stabilizer. A nonlimiting example of a suitable UV stabilizer is a hindered amine light stabilizer (HALS), such as 1,3,5-Triazine-2,4,6-triamine, N,N-1,2-ethanediylbisN-3-4,6-bisbutyl(1,2,2,6,6-pentamethyl-4-piperidinyl)amino-1,3,5-triazin-2-ylaminopropyl-N,N-dibutyl-N,N-bis(1,2,2,6,6-pentamethyl-4-piperidinyl)-1,5,8,12-tetrakis [4,6-bis(n-butyl-n-1,2,2,6,6-pentamethyl-4-piperidylamino)-1,3,5-triazin-2-yl]-1,5,8,12-tetraazadodecane. In an embodiment, the composition contains from 0 wt %, or 0.001 wt % to 0.01 wt %, or 1.0 wt %, or 3.0 wt % UV absorber or stabilizer, based on total weight of the composition.

In an embodiment, the additive has a specific gravity equal to, or greater than, 1.00 g/cc. In another embodiment, the additive has a specific gravity of from 1.00 g/cc, or 1.01 g/cc to 1.05 g/cc, or 1.10 g/cc.

In an embodiment, the composition contains an additive selected from wood, glass, metal, and combinations thereof. In a further embodiment, the additive has a specific gravity of from 1.00 g/cc, or 1.01 g/cc to 1.05 g/cc, or 1.10 g/cc.

The optional additive may comprise two or more embodiments disclosed herein.

D. Composition

In an embodiment, the composition contains polypropylene and from greater than 0 wt % to less than 3 wt % of the halogen-free flame retardant, based on the total weight of the composition. The composition has a specific gravity greater than 1.00 g/cc. In an embodiment, the composition further includes (C) an optional additive.

In an embodiment, the composition contains a polypropylene and greater than 20 wt % zinc sulfide, based on the total weight of the composition. The composition has a specific gravity greater than 1.00 g/cc. In an embodiment, the composition further includes (C) an optional additive.

In an embodiment, the composition contains (A) a polypropylene; (B) a halogen-free flame retardant; and (C) greater than 20 wt % zinc sulfide, based on the total weight of the composition. The composition has a specific gravity greater than 1.00 g/cc. In an embodiment, the composition further includes (D) an optional additive.

In an embodiment, the composition has a specific gravity of from greater than 1.00 g/cc, or 1.01 g/cc, or 1.05 g/cc to 1.08 g/cc, or 1.09 g/cc, or 1.10 g/cc. In another embodiment, the composition has a specific gravity of from greater than 1.00 g/cc to 1.10 g/cc, or from 1.01 g/cc to 1.10 g/cc, or from 1.05 g/cc to 1.10 g/cc. The composition having a specific gravity greater than 1.00 g/cc is advantageous because it results in a geosynthetic that sinks in water. In other words, the geosynthetic resists uplifting buoyant forces in drainage and underwater applications. A geosynthetic that sinks in water is advantageous because it avoids and/or minimizes the need for anchorage of the geosynthetic and provides improved consistence of geosynthetic-to-soil contact. Consequently, the present geosynthetic is particularly suitable for hydraulic applications, where the geosynthetic is located underwater for a period of time-such as in or along streams, banks, ponds, canals, channels, levees, and shorelines.

In an embodiment, the composition is halogen-free. In other words, the composition is void of, or substantially void of any component that contains a halogen atom.

In an embodiment, the composition is bromine-free. In other words, the composition is void of, or substantially void of any component that contains a bromine atom.

In an embodiment, the composition contains (A) polypropylene, (B) halogen-free flame retardant other than zinc sulfide, and (C) greater than 20 wt % zinc sulfide, based on the total weight of the composition. The composition has a specific gravity of greater than 1.00 g/cc, or from greater than 1.00 g/cc to 1.10 g/cc, or from 1.01 g/cc to 1.10 g/cc, or from 1.05 g/cc to 1.10 g/cc.

In an embodiment, the composition contains (A) polypropylene, (B) halogen-free flame retardant selected from metal hydrates, silica, glass powder, metal carbonate, antimony trioxide, amines, and combinations thereof, and (C) greater than 20 wt % zinc sulfide, based on the total weight of the composition. The composition has a specific gravity of greater than 1.00 g/cc, or from greater than 1.00 g/cc to 1.10 g/cc, or from 1.01 g/cc to 1.10 g/cc, or from 1.05 g/cc to 1.10 g/cc.

In an embodiment, the composition contains, consists essentially of, or consists of:
(A) from 90 wt % to less than 100 wt %, or from greater than 97 wt % to less than 100 wt %, or from 97.01 wt % to 99.99 wt %, or from 97.5 wt % to 99.9 wt %, or from 98 wt % to 99.9 wt %, or from 98.5 wt % to 99.9 wt % polypropylene;
(B) from greater than 0 wt % to less than 3 wt %, or from 0.01 wt % to 2.99 wt %, or from 0.01 wt % to 2.50 wt %, or from 0.01 wt % to 2.00 wt %, or from 0.01 wt % to 1.50 wt % halogen-free flame retardant;
(C) optionally, one or more additive, wherein the additive has a specific gravity of from 1.00 g/cc, or 1.01 g/cc to 1.05 g/cc, or 1.10 g/cc;
wherein the weight percents are based on the total weight of the composition; and the composition has a specific gravity of greater than 1.00 g/cc, or from greater than 1.00 g/cc to 1.10 g/cc, or from 1.01 g/cc to 1.10 g/cc, or from 1.05 g/cc to 1.10 g/cc.

In an embodiment, the composition contains, consists essentially of, or consists of:
(A) from 50 wt % to 80 wt %, or from 50 wt % to less than 80 wt %, or from 25 wt % to 79 wt %, or from 50 wt % to 79 wt %, or from 70 wt % to 79 wt %, or from 73 wt % to 79 wt %, or from 50 wt % to 75 wt %, or from 70 wt % to 75 wt %, or from 70 wt % to 73 wt % polypropylene;
(B) from greater than 20 wt % to less than 100 wt %, or from 21 wt % to 75 wt %, or from 21 wt % to 50 wt %, or from 21 wt % to 30 wt %, or from 21 wt % to 27 wt %, or from 25 wt % to 50 wt %, or from 25 wt % to 30 wt %, or from 27 wt % to 30 wt % zinc sulfide;
(C) optionally, one or more additive, wherein the additive has a specific gravity of from 1.00 g/cc, or 1.01 g/cc to 1.05 g/cc, or 1.10 g/cc;
wherein the weight percents are based on the total weight of the composition; and the composition has a specific gravity of greater than 1.00 g/cc, or from greater than 1.00 g/cc to 1.10 g/cc, or from 1.01 g/cc to 1.10 g/cc, or from 1.05 g/cc to 1.10 g/cc.

In an embodiment, the composition contains, consists essentially of, or consists of:
(A) from 50 wt % to less than 80 wt %, or from 50 wt % to less than 80 wt %, or from 25 wt % to 79 wt %, or from 50 wt % to 79 wt %, or from 70 wt % to 79 wt %, or from 73 wt % to 79 wt %, or from 50 wt % to 75 wt %, or from 70 wt % to 75 wt %, or from 70 wt % to 73 wt % polypropylene;
(B) from greater than 0 wt % to 20 wt %, or from greater than 0 wt % to 15 wt %, or from greater than 0 wt % to 10 wt %, or from greater than 0 wt % to 5 wt %, or from greater than 0 wt % to 3 wt %, or from 1 wt % to 3 wt %, or from 1 wt % to 5 wt %, or from 1 wt % to 10 wt %, or from 3 wt % to 10 wt %, or from 3 wt % to 5 wt %, or from 1 wt % to 20 wt %, or from 3 wt % to 20 wt % halogen-free flame retardant;
(C) from greater than 20 wt % to less than 100 wt %, or from 21 wt % to 75 wt %, or from 21 wt % to 50 wt %, or from 21 wt % to 30 wt %, or from 21 wt % to 27 wt %, or from 25 wt % to 50 wt %, or from 25 wt % to 30 wt %, or from 27 wt % to 30 wt % zinc sulfide;
(D) optionally, one or more additive, wherein the additive has a specific gravity of from 1.00 g/cc, or 1.01 g/cc to 1.05 g/cc, or 1.10 g/cc;
wherein the weight percents are based on the total weight of the composition; and the composition has a specific gravity of greater than 1.00 g/cc, or from greater than 1.00 g/cc to 1.10 g/cc, or from 1.01 g/cc to 1.10 g/cc, or from 1.05 g/cc to 1.10 g/cc.

It is understood that the sum of the components in each of the foregoing compositions yields 100 weight percent (wt %).

The composition may comprise two or more embodiments disclosed herein.

E. Geosynthetic

The present disclosure provides a geosynthetic containing the composition. The composition may be any composition disclosed herein. A "geosynthetic" is a polymeric product suitable for stabilizing terrain (e.g., soil, vegetation, etc.). Nonlimiting examples of geosynthetics include geotextiles, geogrids, geonets, geomembranes, geocomposites, geosynthetic liners, geocells, geofoam, and combinations thereof.

Figure 2:
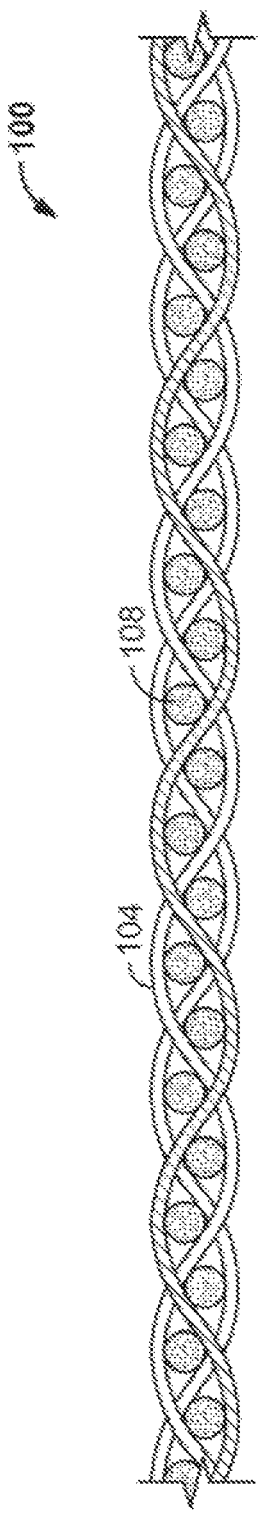
FIG. 2 is a first cross-sectional side view of the woven geotextile of FIG. 1.
Figure 3:
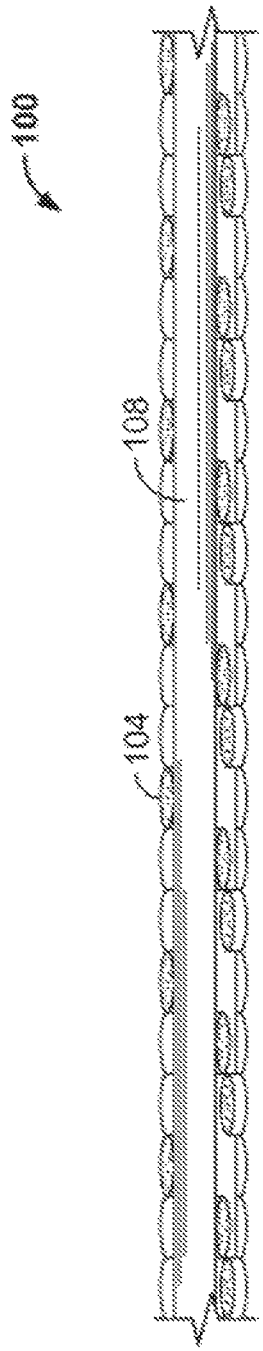
FIG. 3 is a second cross-sectional side view of the woven geotextile of FIG. 1.

In an embodiment, the geosynthetic is a geotextile. A "geotextile" is a continuous sheet of woven, non-woven, knitted, or stitch-bonded fibers or yarns. The sheets are flexible and permeable. Geotextiles may be used for separation, filtration, drainage, reinforcement, and erosion control applications. The geotextile may advantageously be used to prevent erosions of waterways and other areas subject to wearing away as it is not only effective and durable, but also straightforward and inexpensive to make, transport, and assemble. In addition, once plant growth has been established, the geotextile may provide attractive, natural-looking scenery. FIGS. 1, 2, and 3 show a nonlimiting example of a suitable woven geotextile 100 that includes warp 104 and weft 108 filament, fiber, and/or yarn.

In an embodiment, the geosynthetic is a geogrid. A "geogrid" is a material having an open grid-like appearance, with fibers or yarns extending in two perpendicular directions. Geogrids may be used for reinforcement of soil applications.

In an embodiment, the geosynthetic is a geonet. A "geonet" is an open grid-like material formed by two sets of coarse, parallel, extruded polymeric strands intersecting at a constant acute angle. The network forms a sheet with in-plane porosity that may be used to carry relatively large fluid or gas flows.

In an embodiment, the geosynthetic is a geomembrane. A "geomembrane" is a continuous flexible sheet manufactured from one or more synthetic materials. The sheet is impermeable, or substantially impermeable. The geomembrane may be used as liners for fluid or gas containment, and as vapor barriers.

In an embodiment, the geosynthetic is a geocomposite. A "geocomposite" is a geosynthetic made from a combination of two or more geosynthetic types. Nonlimiting examples of geocomposites include geotextile-geonet, geotextile-geogrid, and geonet-geomembrane.

In an embodiment, the geosynthetic is a geosynthetic liner. A "geosynthetic liner" is a geocomposite that is prefabricated with a bentonite clay layer incorporated between a top and bottom geotextile layer, or bonded to a geomembrane or single layer of geotextile. The geosynthetic liner may be stitched or needle-punched through the bentonite clay layer. When hydrated, geosynthetic liners are effective as a barrier for liquid or gas and may be used in landfill liner applications.

In an embodiment, the geosynthetic is a geocell. A "geocell" is a three-dimensional network constructed from strips of polymeric sheet. The strips are joined together to form interconnected cells that are infilled with soil and/or concrete.

In an embodiment, the geosynthetic is a geofoam. A "geofoam" is a block or slab created by expansion of a polymeric material to form a foam containing a matrix of polymeric material with closed, gas-filled cells dispersed throughout. Geofoam may be used for thermal insulation, as a lightweight fill, or as a compressible vertical layer to reduce earth pressures against rigid walls.

The geosynthetic may optionally include a structural element, such as a cage. The cage may be a mesh, a frame, a perforated, sheet, a grid, or a combination thereof. The cage has open holes sized to enable water to flow through the holes without pressure. The cage may be formed from metal, plastic, fiberglass, stone, clay, cement, or mixtures thereof. The cage may have a structured shape or a free-form shape.

In an embodiment, the geosynthetic is a continuous structure with two opposing surfaces.

The geosynthetic may be formed from filament, fiber, and/or yarn containing the composition. In an embodiment, the geosynthetic is formed from filament, fiber, and/or yarn consisting essentially of, or consisting of the composition. In an embodiment, the filament, fiber, and/or yarn has a denier of from 300, or 500, or 1000, or 1100, or 1200 to 1500, or 2000, or 2500, or 3000, or 4000, or 5000. In another embodiment, the filament, fiber, and/or yarn has a denier of from 300 to 5000, or from 300 to 2000, or from 500 to 1100, or from 1000 to 5000, or from 1100 to 5000, or from 1100 to 2500, or from 1200 to 2000. In an embodiment, each filament, fiber, and/or yarn containing the composition has the same, or substantially the same denier. In another embodiment, the geosynthetic contains filament, fiber, and/or yarn containing the composition having at least two distinct denier values.

The filament, fiber, and/or yarn containing the composition have a cross-sectional shape. Nonlimiting examples of suitable cross-sectional shapes include circle, oval, square, rectangle, and triangle. FIGS. 1, 2, and 3 show warp 104 and weft 108 filament, fiber, and/or yarn having a circular cross-sectional shape.

In an embodiment, the geosynthetic optionally contains from filament, fiber, and/or yarn formed from natural materials (e.g., wool, hemp, coconut, jute, or combinations thereof) or synthetic materials (e.g., polyester, nylon, rayon, polytetrafluoroethylene, aromatic polyamide aramid, poly para-phenyleneterephthalamide, and combinations thereof), and combinations thereof.

In an embodiment, the filament, fiber, and/or yarn of the geosynthetic are bonded together by a polymeric resin.

In an embodiment, the filament, fiber, and/or yarn of the geosynthetic are bonded together by heat treatment (i.e., heat set). Heat treatment may be accomplished by infrared radiation, hot calendaring, or any other suitable heat source. Typical temperature ranges for the heat treatment are from 110 to 175° C.

In an embodiment, the geosynthetic further includes a vegetative-sustaining material. Nonlimiting examples of suitable vegetative-sustaining material include soil, mulch, compost, hydroseeding, sand, fertilizer, and combinations thereof. The vegetative-sustaining material is applied to a surface of the geosynthetic and/or embedded within the geosynthetic.

In an embodiment, the geosynthetic is pre-seeded with plants, hydro-seeded, has live plants attached thereto, or a combination thereof. The seeds and/or live plants may be applied to a surface of the geosynthetic and/or embedded within the geosynthetic. Irrigation lines or other means for fertilizing or watering can also be attached to the geosynthetic.

In an embodiment, the geo synthetic has a specific gravity of from greater than 1.00 g/cc, or 1.01 g/cc, or 1.05 g/cc to 1.08 g/cc, or 1.09 g/cc, or 1.10 g/cc. In another embodiment, the geosynthetic has a specific gravity of from greater than 1.00 g/cc to 1.10 g/cc, or from 1.01 g/cc to 1.10 g/cc, or from 1.05 g/cc to 1.10 g/cc.

In an embodiment, the geosynthetic can pass the NFPA (i.e., National Fire Protection Association) 701 testing procedure and still meet a 90% tensile retention for at least about 6000 hours, per ASTM D4355 xenon arc UV exposure (a test by the American Society for Testing and Materials that covers the determination of the deterioration in tensile strength of geotextiles by exposure to xenon arc radiation, moisture, and heat), and meet a strength specification, for example, of 4000 lbs.×3000 lbs./ft. Alternatively or additionally, the geosynthetic meets the requirements of one or more flame retardant testing standards such as for example Federal MIL STD 191A Method 5903.1 Vertical flame test; NFPA 701 Vertical Flame Test; and/or ASTM D6413 Vertical Flame Test of Textiles (Test Method D6413 has been adopted from Federal Test Standard No. 191A method 5903.1).

In an embodiment, the geosynthetic can pass the UL-94 testing procedure.

In an embodiment, the geosynthetic can pass the Federal Motor Vehicle Safety Standard 302 (FMVSS 302) testing procedure. In other words, the geosynthetic has a burn rate of less than 100 mm/sec, as tested in accordance with FMVSS 302. In another embodiment, the geosynthetic has a burn rate of from 0 mm/sec to less than 100 mm/sec, or from 0 mm/sec to 50 mm/sec, or from 0 mm/sec to 25 mm/sec, or from 0 mm/sec to 10 mm/sec, or from 0 mm/sec to 5 mm/sec, or from 0 mm/sec to 1 mm/sec, as tested in accordance with FMVSS 302. In a further embodiment, the geosynthetic has a burn rate of 0 mm/sec, as tested in accordance with FMVSS 302.

In an embodiment, the geosynthetic contains greater than 50 wt % of the composition, or greater than 75 wt % of the composition, or greater than 90 wt % of the composition, based on the total weight of the geosynthetic. In another embodiment, the geosynthetic contains from 50 wt %, or 70 wt %, or 80 wt %, or 90 wt %, or 95 wt % to 98 wt %, or 99 wt %, or 100 wt % of the composition.

In an embodiment, the geosynthetic is halogen-free. In other words, the geosynthetic is void of, or substantially void of any component that contains a halogen atom.

In an embodiment, the geosynthetic contains, consists essentially of, or consists of from 50 wt % to 100 wt %, or from 75 wt % to 100 wt %, or from 90 wt % to 100 wt %, or 100 wt % of the composition containing, consisting essentially of, or consisting of:
  (A) from 90 wt % to less than 100 wt %, or from greater than 97 wt % to less than 100 wt %, or from 97.01 wt % to 99.99 wt %, or from 97.5 wt % to 99.9 wt %, or from 98 wt % to 99.9 wt %, or from 98.5 wt % to 99.9 wt % polypropylene;
  (B) from greater than 0 wt % to less than 3 wt %, or from 0.01 wt % to 2.99 wt %, or from 0.01 wt % to 2.50 wt %, or from 0.01 wt % to 2.00 wt %, or from 0.01 wt % to 1.50 wt % halogen-free flame retardant;
  (C) optionally, one or more additive, wherein the additive has a specific gravity of from 1.00 g/cc, or 1.01 g/cc to 1.05 g/cc, or 1.10 g/cc;
  wherein the weight percents are based on the total weight of the composition; and
  the composition has a specific gravity of greater than 1.00 g/cc, or from greater than 1.00 g/cc to 1.10 g/cc, or from 1.01 g/cc to 1.10 g/cc, or from 1.05 g/cc to 1.10 g/cc; and
  wherein the geosynthetic has one, some, or all of the following properties:
    (i) a specific gravity of from greater than 1.00 g/cc to 1.10 g/cc, or from 1.01 g/cc to 1.10 g/cc, or from 1.05 g/cc to 1.10 g/cc; and/or
    (ii) can pass the NFPA (i.e., National Fire Protection Association) 701 testing procedure and still meet an 90% tensile retention for at least about 6000 hours; and/or
    (iii) meets the requirements of Federal MIL STD 191A Method 5903.1 Vertical flame test; and/or
    (iv) meets the requirements of NFPA 701 Vertical Flame Test; and/or
    (v) meets the requirements of ASTM D6413 Vertical Flame Test of Textiles; and/or
    (vi) has a burn rate of from 0 mm/sec to less than 100 mm/sec, or from 0 mm/sec to 50 mm/sec, or from 0 mm/sec to 25 mm/sec, or from 0 mm/sec to 10 mm/sec, or from 0 mm/sec to 5 mm/sec, or from 0 mm/sec to 1 mm/sec, as tested in accordance with FMVSS 302; and/or
    (vii) meets the requirements of the UL-94 testing standards.

In an embodiment, the geosynthetic contains, consists essentially of, or consists of from 50 wt % to 100 wt %, or from 75 wt % to 100 wt %, or from 90 wt % to 100 wt %, or 100 wt % of the composition containing, consisting essentially of, or consisting of:
  (A) from 50 wt % to less than 80 wt %, or from 50 wt % to less than 80 wt %, or from 25 wt % to 79 wt %, or from 50 wt % to 79 wt %, or from 70 wt % to 79 wt %, or from 73 wt % to 79 wt %, or from 50 wt % to 75 wt %, or from 70 wt % to 75 wt %, or from 70 wt % to 73 wt % polypropylene;
  (B) from greater than 20 wt % to less than 100 wt %, or from 21 wt % to 75 wt %, or from 21 wt % to 50 wt %, or from 21 wt % to 30 wt %, or from 21 wt % to 27 wt %, or from 25 wt % to 50 wt %, or from 25 wt % to 30 wt %, or from 27 wt % to 30 wt % zinc sulfide;
  (C) optionally, one or more additive, wherein the additive has a specific gravity of from 1.00 g/cc, or 1.01 g/cc to 1.05 g/cc, or 1.10 g/cc;
  wherein the weight percents are based on the total weight of the composition; and
  the composition has a specific gravity of greater than 1.00 g/cc, or from greater than 1.00 g/cc to 1.10 g/cc, or from 1.01 g/cc to 1.10 g/cc, or from 1.05 g/cc to 1.10 g/cc; and
  wherein the geosynthetic has one, some, or all of the following properties:
    (i) a specific gravity of from greater than 1.00 g/cc to 1.10 g/cc, or from 1.01 g/cc to 1.10 g/cc, or from 1.05 g/cc to 1.10 g/cc; and/or
    (ii) can pass the NFPA (i.e., National Fire Protection Association) 701 testing procedure and still meet an 90% tensile retention for at least about 6000 hours; and/or
    (iii) meets the requirements of Federal MIL STD 191A Method 5903.1 Vertical Flame Test; and/or
    (iv) meets the requirements of NFPA 701 Vertical Flame Test; and/or
    (v) meets the requirements of ASTM D6413 Vertical Flame Test of Textiles; and/or
    (vi) has a burn rate of from 0 mm/sec to less than 100 mm/sec, or from 0 mm/sec to 50 mm/sec, or from 0 mm/sec to 25 mm/sec, or from 0 mm/sec to 10 mm/sec, or from 0 mm/sec to 5 mm/sec, or from 0 mm/sec to 1 mm/sec, as tested in accordance with FMVSS 302; and/or
    (vii) meets the requirements of the UL-94 testing standards.

In an embodiment, the geosynthetic contains, consists essentially of, or consists of from 50 wt % to 100 wt %, or from 75 wt % to 100 wt %, or from 90 wt % to 100 wt %, or 100 wt % of the composition containing, consisting essentially of, or consisting of:
  (A) from 50 wt % to less than 80 wt %, or from 50 wt % to less than 80 wt %, or from 25 wt % to 79 wt %, or from 50 wt % to 79 wt %, or from 70 wt % to 79 wt %, or from 73 wt % to 79 wt %, or from 50 wt % to 75 wt %, or from 70 wt % to 75 wt %, or from 70 wt % to 73 wt % polypropylene;
  (B) from greater than 0 wt % to 20 wt %, or from greater than 0 wt % to 15 wt %, or from greater than 0 wt % to 10 wt %, or from greater than 0 wt % to 5 wt %, or from greater than 0 wt % to 3 wt %, or from 1 wt % to 3 wt %, or from 1 wt % to 5 wt %, or from 1 wt % to 10 wt %, or from 3 wt % to 10 wt %, or from 3 wt % to 5 wt %, or from 1 wt % to 20 wt %, or from 3 wt % to 20 wt % halogen-free flame retardant;
  (C) from greater than 20 wt % to less than 100 wt %, or from 21 wt % to 75 wt %, or from 21 wt % to 50 wt %, or from 21 wt % to 30 wt %, or from 21 wt % to 27 wt %, or from 25 wt % to 50 wt %, or from 25 wt % to 30 wt %, or from 27 wt % to 30 wt % zinc sulfide;

(D) optionally, one or more additive, wherein the additive has a specific gravity of from 1.00 g/cc, or 1.01 g/cc to 1.05 g/cc, or 1.10 g/cc;

wherein the weight percents are based on the total weight of the composition; and the composition has a specific gravity of greater than 1.00 g/cc, or from greater than 1.00 g/ to 1.10 g/cc, or from 1.01 g/cc to 1.10 g/cc, or from 1.05 g/cc to 1.10 g/cc; and wherein the geosynthetic has one, some, or all of the following properties:

(i) a specific gravity of from greater than 1.00 g/cc to 1.10 g/cc, or from 1.01 g/cc to 1.10 g/cc, or from 1.05 g/cc to 1.10 g/cc; and/or (ii) can pass the NFPA (i.e., National Fire Protection Association) 701 testing procedure and still meet an 90% tensile retention for at least about 6000 hours; and/or (iii) meets the requirements of Federal MIL STD 191A Method 5903.1 Vertical flame test; and/or (iv) meets the requirements of NFPA 701 Vertical Flame Test; and/or (v) meets the requirements of ASTM D6413 Vertical Flame Test of Textiles; and/or (vi) has a burn rate of from 0 mm/sec to less than 100 mm/sec, or from 0 mm/sec to 50 mm/sec, or from 0 mm/sec to 25 mm/sec, or from 0 mm/sec to 10 mm/sec, or from 0 mm/sec to 5 mm/sec, or from 0 mm/sec to 1 mm/sec, as tested in accordance with FMVSS 302; and/or (vii) meets the requirements of the UL-94 testing standards.

It is understood that the sum of the components in each of the foregoing geosynthetic and compositions yields 100 weight percent (wt %).

The geosynthetic may comprise two or more embodiments disclosed herein.

By way of example, and not limitation, some embodiments of the present disclosure will now be described in detail in the following Examples.

EXAMPLES

The materials used in the examples are provided in Table 1 below.

TABLE 1

Materials

| Name | Description and Properties | Source |
|---|---|---|
| Polypropylene | Specific gravity = 0.92 g/cc | Total Polymers |
| Propanediamine | Halogen-Free Flame Retardant | Standridge Color Corporation |
| Zinc Sulfide | Specific gravity = 4.0 g/cc | Standridge Color Corporation |

An Example Composition is prepared by combining the polypropylene with 3 wt % of the halogen-free flame retardant, 27 wt % of the zinc sulfide, and an additive blend to provide color and UV stability, based on the total weight of the composition. The Example Composition is extruded through a die at a temperature of from 193° C. to 227° C. to form a fiber. The fiber is extruded through a water quench bath at a temperature of 70° C. The fiber is then pulled through several blowers and dryers to remove the excess water from the channels of the fiber. The fiber is then drawn into the oven at a temperature of 280±15° C., and a draw ratio of from 6.0/1 to 8.0/1.

Each fiber is one continuous strand (minimum of 160 holes per die), which is wound up on a winder to form a package or spool. Deniers of the fiber range from 300 (333 decitex) to 2000 (2222 decitex). The Example Composition has a specific gravity of 1.08 g/cc.

The fiber is beamed and woven on a loom to form an Example Geotextile. After being woven, the Example Geotextile is heat set in an oven. The weaving process may also be performed on any conventional textile handling equipment suitable for producing fabric of the desired weave type.

The Example Geotextile has a mass/unit area of 14.0 g/m$^2$ (ASTM D-6566) and a thickness of 10.2 mm (ASTM D-6525).

A Comparative Composition and Comparative Geotextile is formed using the same procedure of the Example Geotextile, except that the Comparative Geotextile no halogen-free flame retardant and no zinc sulfide. The Comparative Composition has a specific gravity of 0.92 g/cc.

Thirty specimen are formed of each of the Example Geotextile and the Comparative Geotextile. The Example Geotextile and the Comparative Geotextile are tested in accordance with the Federal Motor Vehicle Safety Standard 302 (FMVSS 302) testing procedure. Prior to testing, each specimen is cut to size in the machine direction. The results are shown below in Tables 2A and 2B. In Table 2A, "CG1" refers to Comparative Geotextile specimen number one, and so on. In Table 2B, "EG1" refers to Example Geotextile specimen number one, and so on.

As shown in Table 2A, over half of the Comparative Geotextile specimen exhibit a burn rate of over 100 mm/sec (for example, CG5 and CG7). In contrast, as shown in Table 2B, none of the Example Geotextile specimen exhibit a burn rate of over 100 mm/sec. In fact, each of the Example Geotextile specimen exhibit a burn rate of 0.0 mm/sec. Consequently, the Example Geotextile is advantageously self-extinguishing.

The Example Geotextile advantageously sinks in water. Consequently, the Example Geotextile is suitable for hydraulic applications such as where the material will be under water for any period of time.

The Example Geotextile is advantageously flame retardant. Consequently, the Example Geotextile is suitable for use in arid dry climates, areas that have a greater fire potential index (including grass fires, forest fires, vandalism, and electrical transmission areas), and areas where regulatory bodies require additional fire retardants.

TABLE 2A

Comparative Geotextile

| Specimen | T (sec) to Extinguish | Total Distance (mm) | D (mm) Beyond 38 mm | Burn Rate (D/T) (mm/sec) | Burn Rate (D/T) (ft/min) |
|---|---|---|---|---|---|
| CG1 | 13 | 56 | 18 | 83 | 16 |
| CG2 | 23 | 51 | 13 | 34 | 7 |
| CG3 | 60 | 109 | 71 | 71 | 14 |
| CG4 | 60 | 117 | 79 | 79 | 16 |
| CG5 | 60 | 147 | 109 | 109 | 21 |
| CG6 | 0 | 15 | 0 | 0 | 0 |
| CG7 | 60 | 253 | 215 | 215 | 42 |
| CG8 | 60 | 75 | 37 | 37 | 7 |
| CG9 | 60 | 262 | 224 | 224 | 44 |
| CG10 | 0 | 8 | 0 | 0 | 0 |

TABLE 2A-continued

Comparative Geotextile

| Specimen | T (sec) to Extinguish | Total Distance (mm) | D (mm) Beyond 38 mm | Burn Rate (D/T) (mm/sec) | Burn Rate (D/T) (ft/min) |
|---|---|---|---|---|---|
| CG11 | 60 | 324 | 286 | 286 | 56 |
| CG12 | 60 | 145 | 107 | 107 | 21 |
| CG13 | 60 | 295 | 257 | 257 | 51 |
| CG14 | 60 | 285 | 247 | 247 | 49 |
| CG15 | 60 | 127 | 89 | 89 | 18 |
| CG16 | 60 | 355 | 317 | 317 | 62 |
| CG17 | 60 | 254 | 216 | 216 | 43 |
| CG18 | 0 | 7 | 0 | 0 | 0 |
| CG19 | 60 | 141 | 103 | 103 | 20 |
| CG20 | 60 | 210 | 172 | 172 | 34 |
| CG21 | 60 | 131 | 93 | 93 | 18 |
| CG22 | 60 | 218 | 180 | 180 | 35 |
| CG21 | 60 | 185 | 147 | 147 | 29 |
| CG22 | 0 | 10 | 0 | 0 | 0 |
| CG23 | 60 | 169 | 131 | 131 | 26 |
| CG24 | 22 | 38 | 0 | 0 | 0 |
| CG25 | 60 | 118 | 80 | 80 | 16 |
| CG26 | 60 | 96 | 58 | 58 | 11 |
| CG27 | 60 | 305 | 267 | 267 | 53 |
| CG28 | 60 | 341 | 303 | 303 | 60 |
| CG29 | 13 | 56 | 18 | 83 | 16 |
| CG30 | 23 | 51 | 13 | 34 | 7 |
| Average | | 162 | 127 | 130 | 26 |

TABLE 2B

Example Geotextile

| Specimen | T (sec) to Extinguish | Total Distance (mm) | D (mm) Beyond 38 mm | Burn Rate (D/T) (mm/sec) | Burn Rate (D/T) (ft/min) |
|---|---|---|---|---|---|
| EG1 | 0 | 30.0 | 0 | 0 | 0 |
| EG2 | 0 | 25.0 | 0 | 0 | 0 |
| EG3 | 0 | 20.0 | 0 | 0 | 0 |
| EG4 | 0 | 12.0 | 0 | 0 | 0 |
| EG5 | 0 | 18.0 | 0 | 0 | 0 |
| EG6 | 0 | 11.0 | 0 | 0 | 0 |
| EG7 | 0 | 9.0 | 0 | 0 | 0 |
| EG8 | 0 | 12.0 | 0 | 0 | 0 |
| EG9 | 0 | 13.0 | 0 | 0 | 0 |
| EG10 | 0 | 14.0 | 0 | 0 | 0 |
| EG11 | 0 | 8.0 | 0 | 0 | 0 |
| EG12 | 0 | 17.0 | 0 | 0 | 0 |
| EG13 | 0 | 15.0 | 0 | 0 | 0 |
| EG14 | 0 | 4.0 | 0 | 0 | 0 |
| EG15 | 0 | 12.0 | 0 | 0 | 0 |
| EG16 | 0 | 25.0 | 0 | 0 | 0 |
| EG17 | 0 | 17.0 | 0 | 0 | 0 |
| EG18 | 0 | 13.0 | 0 | 0 | 0 |
| EG19 | 0 | 7.0 | 0 | 0 | 0 |
| EG20 | 0 | 27.0 | 0 | 0 | 0 |
| EG21 | 0 | 9.0 | 0 | 0 | 0 |
| EG22 | 0 | 19.0 | 0 | 0 | 0 |
| EG21 | 0 | 18.0 | 0 | 0 | 0 |
| EG22 | 0 | 17.0 | 0 | 0 | 0 |
| EG23 | 0 | 26.0 | 0 | 0 | 0 |
| EG24 | 0 | 24.0 | 0 | 0 | 0 |
| EG25 | 0 | 10.0 | 0 | 0 | 0 |
| EG26 | 0 | 9.0 | 0 | 0 | 0 |
| EG27 | 0 | 12.0 | 0 | 0 | 0 |
| EG28 | 0 | 11.0 | 0 | 0 | 0 |
| EG29 | 0 | 30.0 | 0 | 0 | 0 |
| EG30 | 0 | 25.0 | 0 | 0 | 0 |
| Average | | 15.5 | 0.0 | 0.0 | 0.0 |

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A geosynthetic comprising:
   a composition comprising:
     a polymer that consists of a propylene homopolymer;
     from greater than 0 wt % to less than 3 wt % of a halogen-free flame retardant, based on the total weight of the composition;
     greater than 20 wt % zinc sulfide; and
   wherein the composition has a specific gravity greater than 1.00.

2. The geosynthetic of claim 1, wherein the composition has a specific gravity from 1.01 to 1.10.

3. The geosynthetic of claim 1, wherein the geosynthetic has a specific gravity greater than 1.00.

4. The geosynthetic of claim 1, wherein the composition is halogen-free.

5. The geosynthetic of claim 1, wherein the composition comprises an additive having a specific gravity greater than 1.00.

6. The geosynthetic of claim 1, wherein the halogen-free flame retardant is propanediamine.

7. The geosynthetic of claim 1, wherein the geosynthetic is a geotextile comprising fibers comprising the composition.

8. The geosynthetic of claim 1, wherein the geosynthetic has a burn rate of from 0 mm/sec to less than 100 mm/sec, as tested in accordance with FMVSS 302.

9. A geosynthetic comprising:
   a composition comprising:
     a polymer that consists of a polypropylene homopolymer;
     a halogen-free flame retardant;
     greater than 20 wt % zinc sulfide, based on the total weight of the composition; and
   the composition has a specific gravity greater than 1.00.

10. The geosynthetic of claim 9, wherein the composition comprises from greater than 0 wt % to 20 wt % of the halogen-free flame retardant, based on the total weight of the composition.

11. The geosynthetic of claim 9, wherein the composition has a specific gravity from 1.01 to 1.10.

12. The geosynthetic of claim 9, wherein the geosynthetic has a specific gravity greater than 1.00.

13. The geosynthetic of claim 9, wherein the composition is halogen-free.

14. The geosynthetic of claim 9, wherein the composition comprises an additive having a specific gravity greater than 1.00.

15. A geosynthetic comprising:
   a composition comprising:
     a polyproylene;
     a halogen-free flame retardant;
     greater than 20 wt % zinc sulfide, based on the total weight of the compositions; and
     the composition has a specific gravity greater than 1.00; and
   wherein the halogen-free flame retardant is propanediamine.

16. The geosynthetic of claim 9, wherein the geosynthetic is a geotextile comprising fibers comprising the composition.

17. The geosynthetic of claim 9, wherein the geosynthetic has a burn rate of from 0 mm/sec to less than 100 mm/sec, as tested in accordance with FMVSS 302.

18. A geosynthetic comprising:
a composition comprising:
- a polymer that consists of a polypropylene homopolymer;
- greater than 20 wt % zinc sulfide, based on the total weight of the composition; and
- wherein the composition has a specific gravity greater than 1.00, and wherein the geosynthetic has a burn rate of from 0 mm/sec to less than 100 mm/sec, as tested in accordance with FMVSS 302.

19. The geosynthetic of claim 18, wherein the composition has a specific gravity from 1.01 to 1.10.

20. The geosynthetic of claim 18, wherein the geosynthetic has a specific gravity greater than 1.00.

21. The geosynthetic of claim 18, wherein the composition is halogen-free.

22. The geosynthetic of claim 18, wherein the composition comprises an additive having a specific gravity greater than 1.00.

23. The geosynthetic of claim 18, wherein the geosynthetic is a geotextile comprising fibers comprising the composition.

24. The geosynthetic of claim 1, wherein the woven or the nonwoven comprises a filament, a fiber, a yarn, or a combination thereof, containing the composition.

25. The geosynthetic of claim 24, wherein the filament, the fiber, the yarn, or the combination thereof, has a denier of from about 300 to about 5000.

* * * * *